United States Patent
King

(10) Patent No.: US 6,962,018 B1
(45) Date of Patent: Nov. 8, 2005

(54) DUAL FISHING POLE HOLDER

(76) Inventor: Mark A. King, 323-A S. Garfield, Traverse City, MI (US) 49686

( * ) Notice: Subject to any disclaimer, the term of this patent is extended or adjusted under 35 U.S.C. 154(b) by 0 days.

(21) Appl. No.: 10/824,105

(22) Filed: Apr. 14, 2004

(51) Int. Cl.$^7$ ............................................. A01K 97/10
(52) U.S. Cl. ....................................................... 43/21.2
(58) Field of Search ............................ 43/21.2, 16, 17, 43/15; 248/515

(56) References Cited

U.S. PATENT DOCUMENTS

| | | | |
|---|---|---|---|
| 291,248 A | 1/1884 | West | |
| 1,719,695 A | 7/1929 | Ferguson | |
| 2,220,234 A | 11/1940 | Hadaway | |
| 2,513,475 A * | 7/1950 | Grevich | 43/21.2 |
| 2,606,731 A * | 8/1952 | Harris | 43/21.2 |
| 2,693,660 A * | 11/1954 | Nebergall et al. | 43/21.2 |
| 2,905,413 A * | 9/1959 | Harris | 43/21.2 |
| 2,939,662 A | 6/1960 | Johnson | |
| 2,985,414 A | 5/1961 | Ince | |
| 3,139,252 A * | 6/1964 | Mann | 248/538 |
| 3,322,423 A | 5/1967 | Popow et al. | |
| 3,385,544 A * | 5/1968 | Barnett | 248/513 |
| 3,783,548 A | 1/1974 | Fisher | |
| 3,897,922 A | 8/1975 | Keen | |
| 4,004,365 A | 1/1977 | Manchester | |
| 4,017,998 A * | 4/1977 | Dumler | 43/21.2 |
| 4,198,775 A * | 4/1980 | Leisner | 43/21.2 |
| 4,650,146 A | 3/1987 | Duke | |
| 4,739,575 A | 4/1988 | Behrle | |
| 4,852,290 A * | 8/1989 | Wallace et al. | 43/17 |
| 5,033,223 A | 7/1991 | Minter | |
| 5,131,179 A | 7/1992 | McEwen | |
| D356,140 S | 3/1995 | Meyer et al. | |
| 5,975,479 A * | 11/1999 | Suter | 248/534 |
| 6,338,465 B1 | 1/2002 | Stoner | |
| 6,766,757 B1 * | 7/2004 | Tilley | 114/255 |
| 2002/0023379 A1 | 2/2002 | Elford | |

FOREIGN PATENT DOCUMENTS

GB    2178931 A  *  2/1987  .......... A01K 97/10

* cited by examiner

Primary Examiner—Harvey E. Behrend
Assistant Examiner—Susan C. Alimenti
(74) Attorney, Agent, or Firm—Brooks Kushman P.C.

(57) ABSTRACT

A fishing pole holder for supporting multiple fishing poles on a fishing boat wall. The holder includes clamping structure for securing the holder to a boat wall and accommodating ready attachment to the boat wall and removal for storage without a need for special tools. Holder elements are adjustable to provide desired pole separation and desired elevation angle during trolling events.

4 Claims, 3 Drawing Sheets

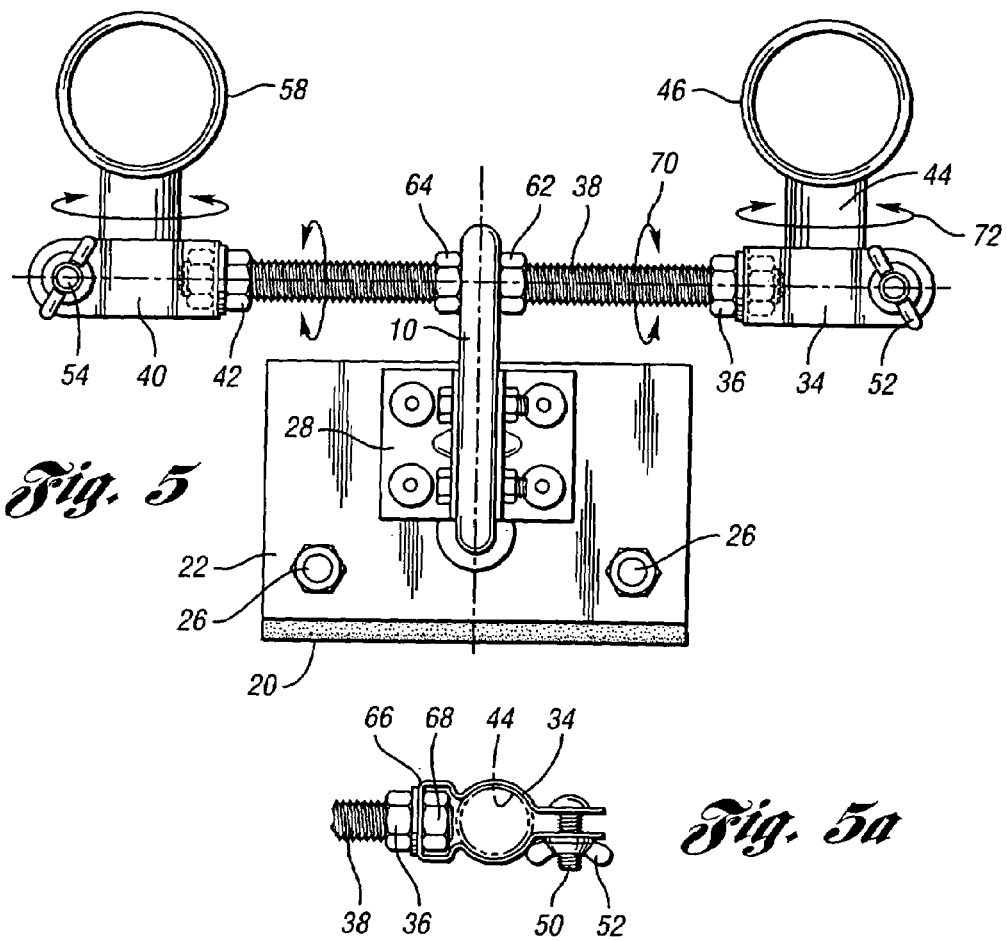
*Fig. 5*
*Fig. 5a*
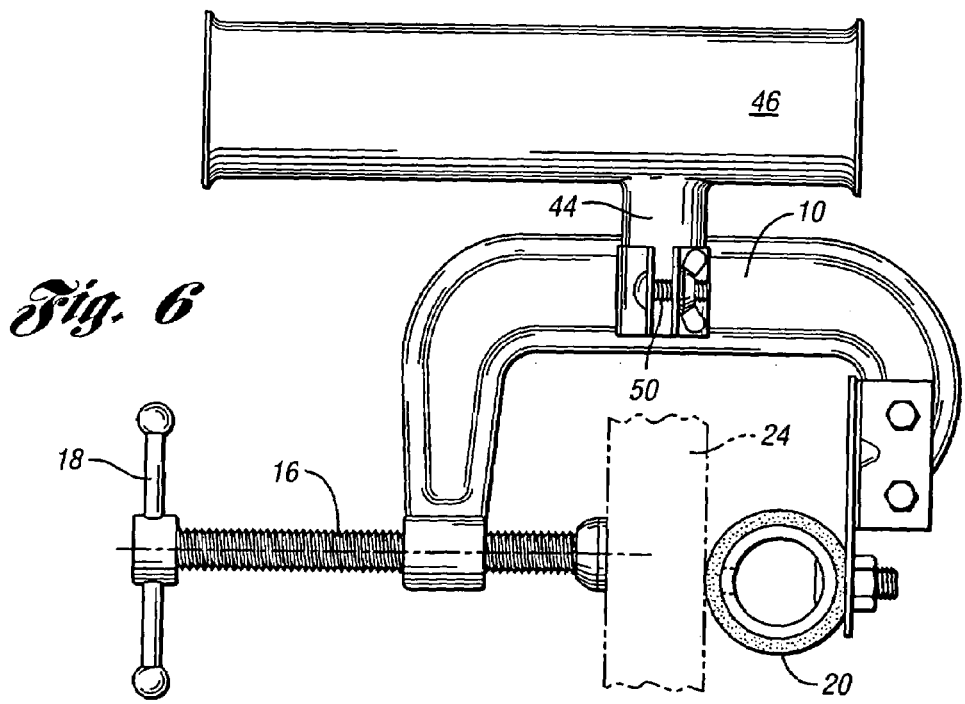
*Fig. 6*

DUAL FISHING POLE HOLDER

BACKGROUND OF THE INVENTION

1. Field of the Invention

The invention relates to sport fishing and, in particular, to a fishing pole holder that is adaptable for mounting on a gunwale or transom of a fishing boat.

2. Background Art

The sport of recreational fishing includes fly fishing or surf fishing, conducted along a shoreline, and off-shore fishing including trolling or stationary fishing using a fishing boat depending upon the preferences of the fisherman. It would be desirable if equipment used for recreational fishing would be sufficiently versatile to permit use of the equipment for both types of sport fishing. Improved portability and reduced storage space for the equipment are additional desirable features.

Known designs in the prior art relating to sport fishing include fishing pole holders that can be mounted on a stationary structure, such as the transom or gunwale of a fishing boat. These fishing pole holders are capable of holding a fishing pole and will permit the pole to be used independently of the fishing pole holder if the fisherman desires to engage in fly fishing or on-shore surf fishing. Such known fishing pole holders, however, are heavy and are of complex construction. Furthermore, they are not adaptable for easy storage when not in use.

A holder for a single fishing pole is disclosed in U.S. Pat. No. 3,897,922. It comprises a clamping device for securing the fishing pole holder to a vertical member, such as a boat side wall or to the deck of a boat. Clamping members anchoring one end of a fishing pole are locked in place by a complex locking mechanism, including a handle. Adjustment of the fishing pole, after it is locked in place by the handle, can be effected in a vertical plane using an arcuate clamp mechanism.

A surf fishing pole holder is disclosed in U.S. Pat. No. 4,650,146, which includes a complex adjustment bracket assembly for changing the angularity of one pole with respect to the other. The fishing poles are secured to a mounting post that can be anchored to the ground. A fishing pole holder of this type is not adaptable for trolling or other off-shore fishing.

Another example of a fishing pole holder capable of supporting a single fishing pole with a single plane of adjustment is shown in U.S. Pat. No. 2,513,475.

Unlike the previously mentioned prior art designs, the design of U.S. Pat. No. 5,131,179 is designed to hold two fishing poles simultaneously, but it is restricted in its application to on-shore surf fishing. The dual fishing pole holder of the '179 patent, which is anchored when in use to a fish bucket, is not adaptable for off-shore trolling. Neither does it include universal adjustment features for adjusting the fishing poles in multiple planes and for achieving desired separation of the poles to prevent tangles of the fishing lines.

SUMMARY OF THE INVENTION

The fishing pole holder of the present invention overcomes shortcomings in prior art designs such as those shown in the previously discussed prior art patents. It simplifies trolling operation or stationary off-shore fishing from a boat using two fishing poles from one location. It makes provision for positioning each pole, one with respect to the other, with the fishing poles within arm reach so that the fisherman can achieve tangle-free operation of both poles simultaneously.

The fishing pole holder of the invention includes supporting structure that permits the fisherman to adjust the poles to any desired position while keeping the fishing lines far enough apart to avoid tangling, and for adjusting the angularity of each fishing pole independently of the other fishing pole in multiple adjustment planes. The holder includes clamping structure, such as a C-clamp, and a yieldable reaction cushion member that provide rigidity and stability at anchor points for each pole. The clamping structure permits the fishing pole holder to be mounted or removed readily from a gunwale or transom of a fishing boat without the use of special tools.

BRIEF DESCRIPTION OF THE DRAWINGS

FIG. 5 is a detailed rear view of the fishing pole holder of FIG. 1 showing the direction of adjustments in two adjustment planes for the dual fishing rod;

FIG. 5a is a detail sub-assembly view of a clamp for holding pole holder elements; and FIG. 6 is a view similar to the view of FIG. 2, but the fishing pole holder is viewed from a perspective at a point on a reference line perpendicular to the plane of FIG. 2, the holder element for the fishing rod being adjusted to a horizontal position.

DETAILED DESCRIPTION OF THE PREFERRED EMBODIMENT(S)

Figure 1:
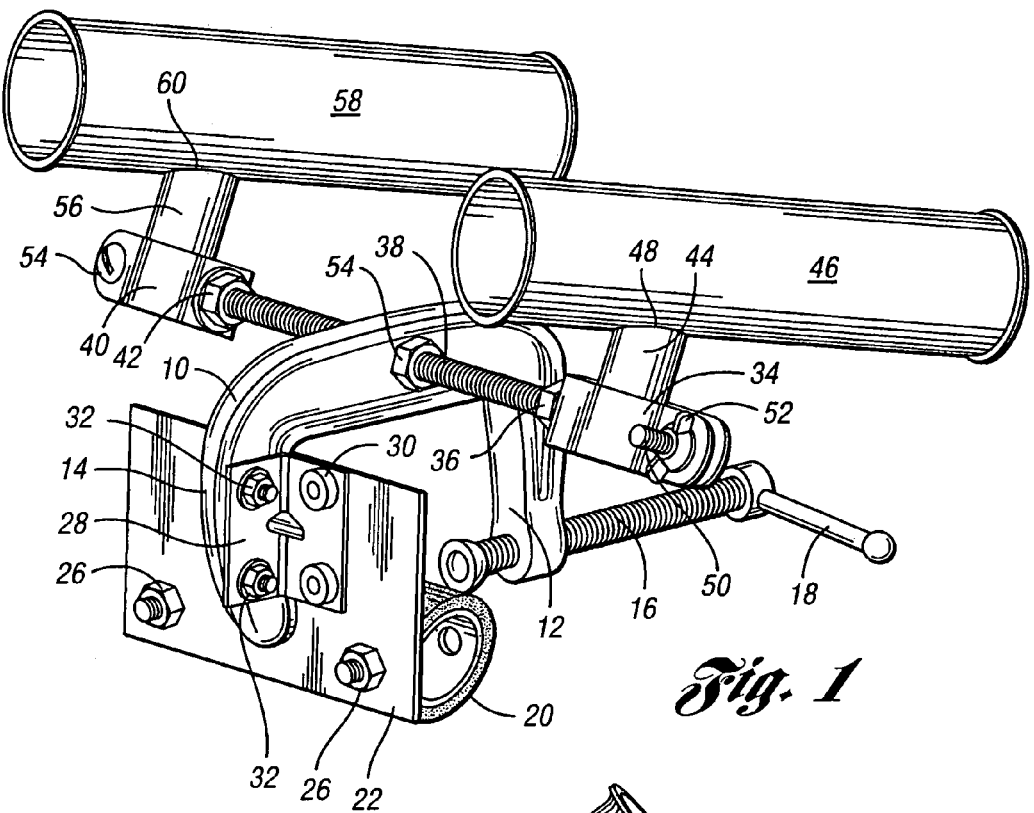
FIG. 1 is an isometric side view of the fishing pole holder of the invention.

The dual fishing pole holder of the invention comprises a C-clamp 10 with clamping arms 12 and 14 arranged in spaced parallel relationship, and a threaded adjusting shaft 16 is threadably received in a threaded opening in one end of the arm 12. A manual adjusting lever 18 at the outboard end of the threaded shaft 16 permits the fisherman to rotate the threaded shaft 16 so that it advances toward or retracts from a flexible compliant abutment 20, which is engageable with the outboard side of a generally vertical transom, or side wall, or gunwale of a fishing boat. The abutment 20 is secured to the base plate 22 by bolts 26 or other suitable fastening means. A transom or gunwale is illustrated schematically at 24 in FIG. 6.

A vertical right angle bracket 28 is secured to the outboard surface of a base plate 22 by fastening devices 30, or by welding, or by other suitable fastening techniques. The arm 14 of the C-clamp 10 is secured to one face of the angle bracket 28 by suitable fastening devices, such as the bolted connection at 32.

A first strap clamp 34 is secured by a locking nut 36 to a threaded support shaft 38, which extends through an opening in the base of the C-clamp 10. Likewise, a strap clamp 40 is secured by lock nut 42 to the opposite end of the threaded shaft 38.

The clamp 34 encircles a supporting pedestal 44, preferably of cylindrical shape, the upper end of which is secured to a fishing pole holder element, preferably in the form of a cylindrical tube 46. The connection between pedestal 44 and the holder element 46 preferably is a welded connection as shown at 48. The open end of the clamp 34 receives a clamping bolt member 50, and a wing nut element 52 threadably received on the clamping bolt member 50 permits the fisherman to adjust the pedestal 44 to a desired angular position by making a suitable adjustment of the wing nut element 52. That is followed by tightening of the nut element to lock the pedestal 44 in place. This positions the tubular holder element 46 in a desired angular position about the axis of the pedestal 44.

The clamp 40 may be constructed as a duplicate of the construction of clamp 34. It includes a clamping bolt 54 received through the open end of clamp 40. The clamp 40 is locked in place about the pedestal 56 by a wing nut threadably received on the bolt 54. This locks in place the fishing pole holder element 58 in a desired angular position with respect to the axis of pedestal 56.

The holder element 58, as in the case of the holder element 46, is welded to its supporting pedestal, as shown at 60.

Figure 2:
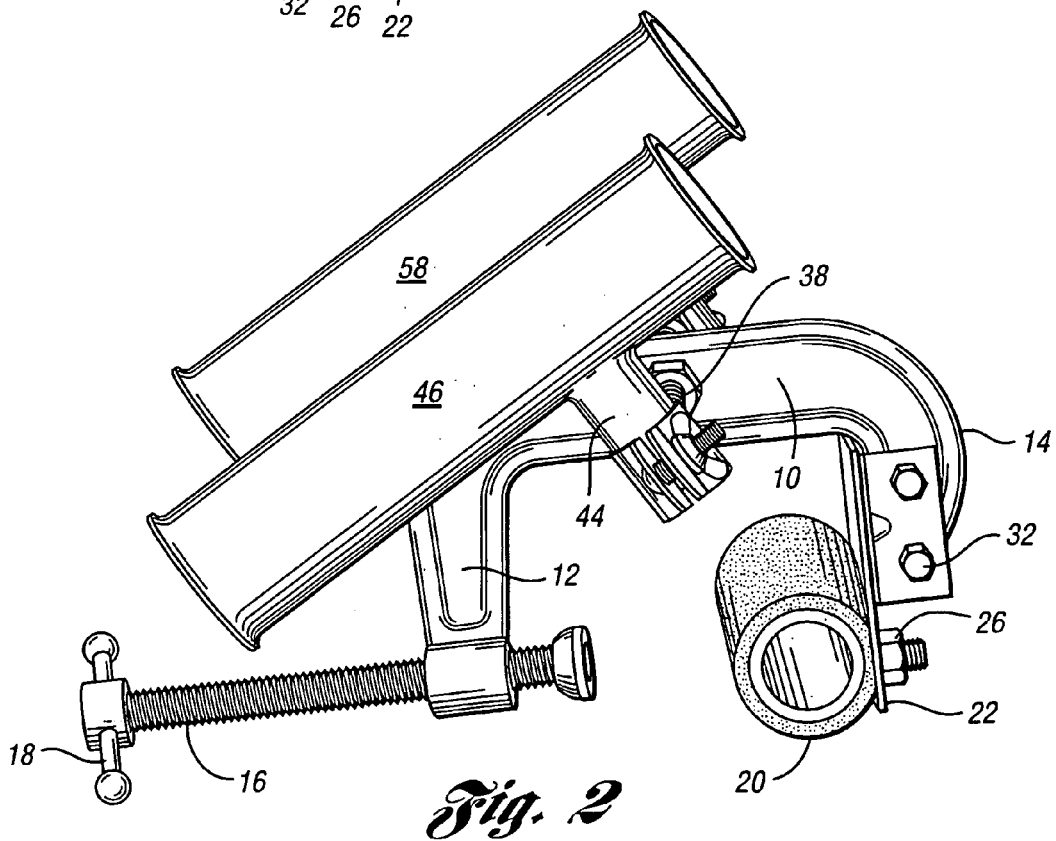
FIG. 2 is a view of the fishing pole holder of FIG. 1 as viewed from one side of the holder.

FIG. 2 shows the same elements illustrated in FIG. 1, but the fishing pole holder elements 46 and 58 are adjusted in vertical planes about the axis of the threaded shaft 38. This is done by loosening the locking nuts 36 and 42 to permit adjustment of the elements 46 and 58 to the desired position. The locking nuts 36 and 42 then are locked in place to secure the elements 46 and 58 in the position shown. The threaded shaft 38 is locked in place by a lock nut 62 to one side of the C-clamp 10 and by a lock nut 64 on the opposite side of the C-clamp 10, as best seen in FIG. 5.

FIG. 5a is a detailed view of the clamp 34. It comprises an open end, which is secured in a clamping position by the clamping bolt 50 as explained previously. The opposite closed end of the clamp 34 has a planar surface 66 with an opening that receives one end of the threaded shaft 38. A second clamping nut 68 is located within the clamp 34 to provide a reaction point for the clamping bolt 36 whereby the clamp 34 is locked on the end of the threaded shaft 38 after the dual rod holder element 46 is adjusted to its proper angular position about the axis of the threaded shaft 38. This adjustment is indicated by the bi-directional arrow 70 in FIG. 5. The clamp 40 may be constructed, as mentioned previously, so that it is similar to the construction of FIG. 5a.

The adjustment of holder element 46 about the axis of the pedestal 44 is indicated by the bi-directional arrow 72 in FIG. 5.

Figure 3:
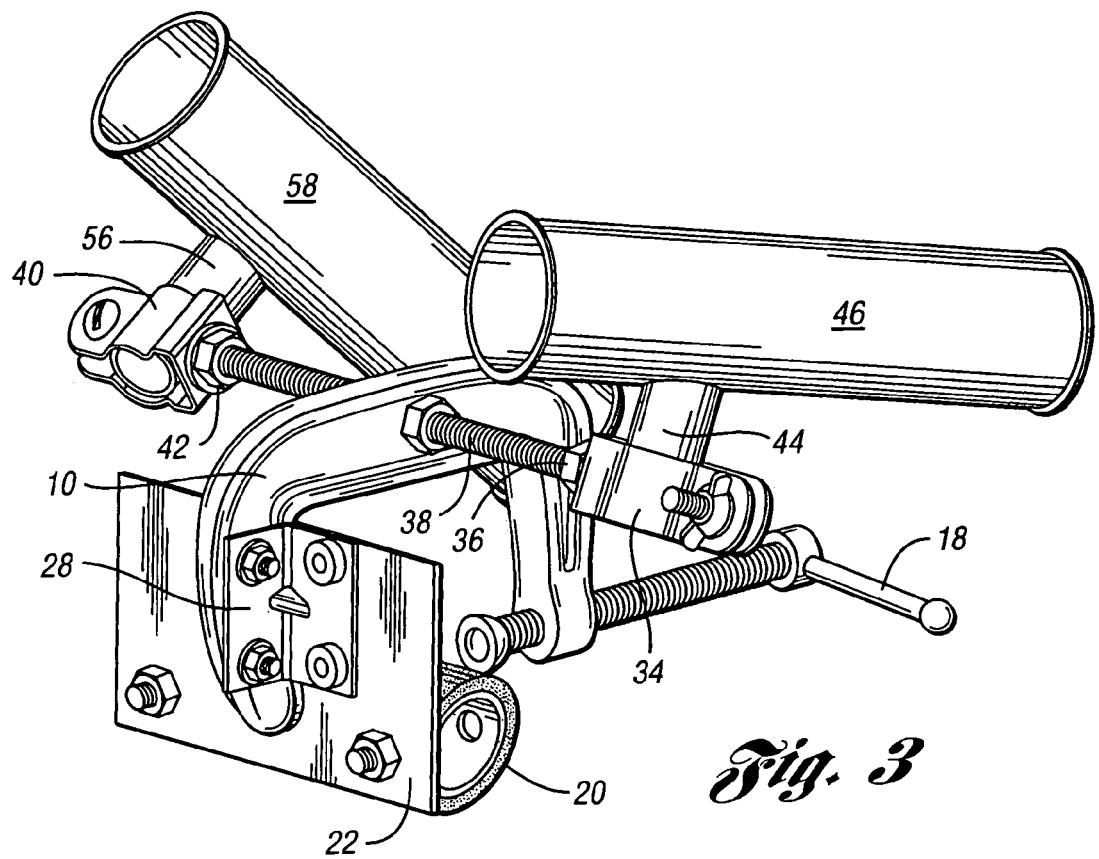
FIG. 3 is a view of the fishing pole holder illustrated in FIG. 1, but which is viewed from a side opposite to the side shown in FIG. 2.
Figure 4:
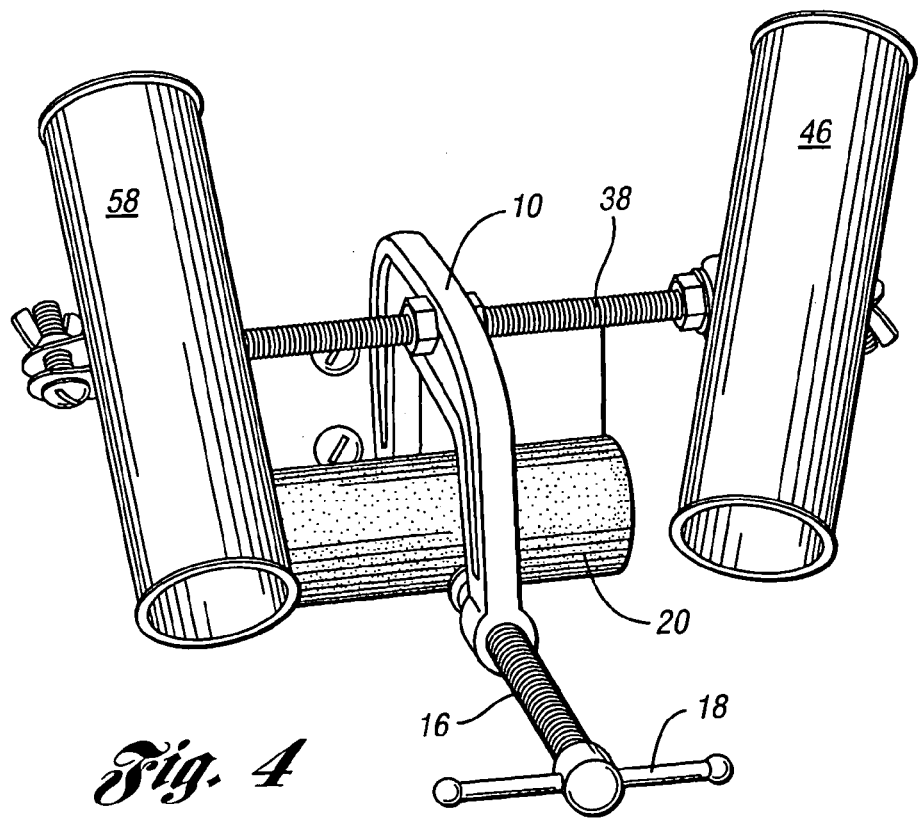
FIG. 4 is a rear view of the fishing pole holder of FIG. 1.

The holder of the invention makes it possible to provide angular separation of the two fishing poles. One fishing pole holder element can be adjusted independently of the other in a horizontal plane as indicated in FIG. 4. Similarly, one fishing pole holder element can be adjusted independently of the other fishing pole holder in a vertical plane, as indicated in FIG. 3. In this fashion, universal adjustment of the fishing poles independently or in tandem can be achieved to provide the proper depth for a lure and line attached to the end of each fishing pole. The separation of the ends of the fishing poles and the fishing lines for each fishing pole can be separated as desired to prevent entanglement during trolling operations by making simple manual adjustments using the adjusting nuts that are within easy reach of the fisherman. As mentioned previously, special tools are not required.

Modifications to the dual fishing pole holder as described may be made by persons skilled in the sport of fishing without departing from the scope of the invention. While such modifications and improvements therein are intended to be covered by the following claims.

What is claimed is:

1. A fishing pole holder for holding in position multiple fishing poles at selected positions while trolling from a fishing boat, the fishing pole holder comprising:
   a C-clamp having a main portion extending, when the fishing pole holder is installed on the boat, over a generally vertical wall of the boat;
   first and second arms on the clamp extending from the main portion adjacent inboard and outboard sides of the wall, respectively;
   a base plate secured to the second arm adjacent the outboard wall side;
   a clamping force reaction cushion secured to the base plate;
   a clamping shaft threadably connected to the first arm and extending generally perpendicular to the force reaction cushion whereby, when the clamping shaft is adjusted to a clamping position, the fishing pole holder is held securely to the wall side;
   a threaded support shaft secured to the main clamp portion and extending from opposite sides of the main clamp portion in a direction generally parallel to the boat wall;
   a first fishing pole holder element secured to the support shaft on one side of the clamp and a second fishing pole holder element secured to the support shaft on the opposite side of the clamp;
   means for adjusting the angular position of the first fishing pole holder element about a first axis that intersects a support shaft axis;
   means for adjusting the angular position of the second fishing pole holder element about a second axis that intersects the support shaft axis;
   means for adjusting the first fishing pole holder element about the axis of the support shaft;
   means for adjusting the second fishing pole holder element about the axis of the support shaft;
   the first and second fishing pole holder elements each being generally cylindrical, each fishing pole holder element being adapted to generally encircle and retain a grip end of a fishing pole;
   the means for adjusting the angular position of the first fishing pole holder element about the first axis and the means for adjusting the angular position of the second fishing pole holder element about the second axis each comprise a pedestal secured to the respective fishing pole holder elements;
   a strap clamp surrounding each pedestal;
   each strap clamp having a closed end secured to the support shaft and an open end; and
   a clamping bolt extending through the open end of each strap clamp and a clamping nut adjustably attached to each clamping bolt whereby each fishing pole holder element is secured in a selected fixed position relative to the boat wall independently of a selected fixed position of the other fishing pole holder element.

2. A fishing pole holder for holding in position multiple fishing poles at selected positions while trolling from a fishing boat, the fishing pole holder comprising:
   a C-clamp having a main portion extending, when the fishing pole holder is installed on the boat, over a generally vertical wall of the boat;
   first and second arms on the clamp extending from the main portion adjacent inboard and outboard sides of the wall, respectively;
   a base plate secured to the second arm adjacent the outboard wall side;

a clamping force reaction cushion secured to the base plate;

a clamping shaft threadably connected to the first arm and extending generally perpendicular to the force reaction cushion whereby, when the clamping shaft is adjusted to a clamping position, the fishing pole holder is held securely to the wall side;

a threaded support shaft secured to the main clamp portion and extending from opposite sides of the main clamp portion in a direction generally parallel to the boat wall;

a first fishing pole holder element secured to the support shaft on one side of the clamp and a second fishing pole holder element secured to the support shaft on the opposite side of the clamp;

means for adjusting the angular position of the first fishing pole holder element about a first axis that intersects a support shaft axis;

means for adjusting the angular position of the second fishing pole holder element about a second axis that intersects the support shaft axis;

means for adjusting the first fishing pole holder element about the axis of the support shaft; and means for adjusting the second fishing pole holder element about the axis of the support shaft;

the first and second fishing pole holder elements each being generally cylindrical, each fishing pole holder element being adapted to generally encircle and retain a grip end of a fishing pole;

the means for adjusting the angular position of the first fishing pole holder element about the first axis and the means for adjusting the angular position of the second fishing pole holder element about the second axis each comprise a pedestal secured to the respective fishing pole holder elements;

strap clamps surrounding each pedestal;

each strap clamp having a closed end secured to the support shaft and an open end; and a clamping bolt extending through the open end of each strap clamp and a clamping nut adjustably attached to each clamping bolt whereby each fishing pole holder element is secured in a selected fixed position relative to the boat wall independently of a selected fixed position of the other fishing pole holder element;

each of the means for adjusting the fishing pole holder elements about the support shaft axis comprising a clamping nut threaded on the support shaft and engaging one of the strap clamps whereby each fishing pole holder element is held in a selected fixed position relative to the support shaft axis.

3. A fishing pole holder for holding in position multiple fishing poles at selected positions while trolling from a fishing boat, the fishing pole holder comprising:

a C-clamp having a main portion extending, when the fishing pole holder is installed on the boat, over a generally vertical wall of the boat;

first and second arms on the clamp extending from the main portion adjacent inboard and outboard sides of the wall, respectively;

a base plate secured to the second arm adjacent the outboard wall side;

a clamping force reaction cushion secured to the base plate;

a clamping shaft threadably connected to the first arm and extending generally perpendicular to the force reaction cushion whereby, when the clamping shaft is adjusted to a clamping position, the fishing pole holder is held securely to the wall side;

a support shaft secured to the main clamp portion and extending from opposite sides of the main clamp portion in a direction generally parallel to the boat wall;

a first fishing pole holder element secured to the support shaft on one side of the clamp and a second fishing pole holder element secured to the support shaft on the opposite side of the clamp;

means for adjusting the angular position of the first fishing pole holder element about a first axis that intersects a support shaft axis;

means for adjusting the angular position of the second fishing pole holder element about a second axis that intersects the support shaft axis;

means for adjusting the first fishing pole holder element about the axis of the support shaft;

means for adjusting the second fishing pole holder element about the axis of the support shaft;

the first and second fishing pole holder elements each being generally cylindrical, each fishing pole holder element being adapted to generally encircle and retain a grip end of a fishing pole;

the means for adjusting the angular position of the first fishing pole holder element about the first axis and the means for adjusting the angular position of the second fishing pole holder element about the second axis each comprise a pedestal secured to the respective fishing pole holder elements;

a strap clamp surrounding each pedestal;

each strap clamp having a closed end secured to the support shaft and an open end; and a clamping member extending through the open end of each strap clamp and a clamping element adjustably attached to each clamping member whereby each fishing pole holder element is secured in a selected fixed position relative to the boat wall independently of a selected fixed position of the other fishing pole holder element.

4. A fishing pole holder for holding in position multiple fishing poles at selected positions while trolling from a fishing boat, the fishing pole holder comprising:

a C-clamp having a main portion extending, when the fishing pole holder is installed on the boat, over a generally vertical wall of the boat;

first and second arms on the clamp extending from the main portion adjacent inboard and outboard sides of the wall, respectively;

a base plate secured to the second arm adjacent the outboard wall side;

a clamping force reaction cushion secured to the base plate;

a clamping shaft threadably connected to the first arm and extending generally perpendicular to the force reaction cushion whereby, when the clamping shaft is adjusted to a clamping position, the fishing pole holder is held securely to the wall side;

a support shaft secured to the main clamp portion and extending from opposite sides of the main clamp portion in a direction generally parallel to the boat wall;

a first fishing pole holder element secured to the support shaft on one side of the clamp and a second fishing pole holder element secured to the support shaft on the opposite side of the clamp;

means for adjusting the angular position of the first fishing pole holder element about a first axis that intersects a support shaft axis;

means for adjusting the angular position of the second fishing pole holder element about a second axis that intersects the support shaft axis;

means for adjusting the first fishing pole holder element about the axis of the support shaft; and means for adjusting the second fishing pole holder element about the axis of the support shaft;

the first and second fishing pole holder elements each being generally cylindrical, each fishing pole holder element being adapted to generally encircle and retain a grip end of a fishing pole;

the means for adjusting the angular position of the first fishing pole holder element about the first axis and the means for adjusting the angular position of the second fishing pole holder element about the second axis each comprise a pedestal secured to the respective fishing pole holder elements;

strap clamps surrounding each pedestal;

each strap clamp having a closed end secured to the support shaft and an open end; and a clamping member extending through the open end of each strap clamp and a clamping element adjustably attached to each clamping member whereby each fishing pole holder element is secured in a selected fixed position relative to the boat wall independently of a selected fixed position of the other fishing pole holder element;

each of the means for adjusting the fishing pole holder elements about the support shaft axis comprising an adjusting element on the support shaft and engaging one of the strap clamps whereby each fishing pole holder element is held in a selected fixed position relative to the support shaft axis.

* * * * *